United States Patent
Bradin et al.

(10) Patent No.: US 8,481,771 B2
(45) Date of Patent: Jul. 9, 2013

(54) BIODIESEL PROCESS

(75) Inventors: David Bradin, Cary, NC (US); Guerry L. Grune, Virginia Beach, VA (US)

(73) Assignee: CPS Biofuels, Inc., Raleigh, NC (US)

( * ) Notice: Subject to any disclaimer, the term of this patent is extended or adjusted under 35 U.S.C. 154(b) by 548 days.

(21) Appl. No.: 12/450,361

(22) PCT Filed: Mar. 21, 2008

(86) PCT No.: PCT/US2008/003759
§ 371 (c)(1),
(2), (4) Date: Sep. 22, 2009

(87) PCT Pub. No.: WO2008/123925
PCT Pub. Date: Oct. 16, 2008

(65) Prior Publication Data
US 2010/0186289 A1   Jul. 29, 2010

Related U.S. Application Data

(60) Provisional application No. 60/919,383, filed on Mar. 22, 2007.

(51) Int. Cl.
*C11C 3/00* (2006.01)
*C10L 1/18* (2006.01)

(52) U.S. Cl.
USPC ............. 554/169; 44/307; 44/308; 554/124; 554/167; 554/168; 554/170

(58) Field of Classification Search
None
See application file for complete search history.

(56) References Cited

U.S. PATENT DOCUMENTS

| | | | |
|---|---|---|---|
| 3,397,128 A | * | 8/1968 | Bode et al. .............. 205/431 |
| 6,015,440 A | * | 1/2000 | Noureddini ................ 44/388 |
| 6,696,583 B2 | * | 2/2004 | Koncar et al. .............. 554/169 |
| 2005/0274065 A1 | * | 12/2005 | Portnoff et al. ............. 44/605 |
| 2006/0270866 A1 | | 11/2006 | Sapienza et al. |

FOREIGN PATENT DOCUMENTS

| | | |
|---|---|---|
| WO | 2007027669 A1 | 3/2007 |
| WO | WO 2007/027669 * | 3/2007 |

OTHER PUBLICATIONS

Ma, F., et al., Biodiesel production: a review, 1999, Bioresource Technology, vol. 70, pp. 1-15.*

* cited by examiner

*Primary Examiner* — Yate K Cutliff
(74) *Attorney, Agent, or Firm* — Guerry L. Grune; ePatentManager.com

(57) ABSTRACT

Processes for producing biodiesel compositions are disclosed. FFAs present in the triglycerides can be removed by reaction with isobutylene, or by Kolbe electrolysis. The Kolbe electrolysis can be performed on the starting material, or on the crude glycerol. The triglycerides are transesterified to form alkyl esters of the fatty acids and glycerol. The transesterification reaction can be catalyzed by an alkoxide, rather than a hydroxide, to help keep the glycerol by-product dry. The alkoxide salt can be neutralized by reaction with a dry acid, such as gaseous hydrogen chloride or sulfuric acid, and the resulting alcohol removed by distillation, and at least a portion of the neutralized salt can be removed by filtration or decantation. The process can provide improved biodiesel yields, and glycerol pure enough for use directly in glycerol ether manufacture.

13 Claims, No Drawings

BIODIESEL PROCESS

This application takes priority under 35 U.S.C. 119(e) from Provisional Application No. 60/919,383, filed Mar. 22, 2007, titled: Biodiesel Process.

FIELD OF THE INVENTION

The present invention relates to process for producing biodiesel fuels, biodiesel fuels, and an integrated process for producing relatively pure glycerol during biodiesel production, and producing glycerol ethers from the relatively pure glycerol.

BACKGROUND OF THE INVENTION

Biodiesel fuel technology is being developed throughout the world as a way to decrease reliance on crude oil, to boost local economies, and to reduce carbon dioxide emissions by using a renewable fuel source. Biodiesel fuel is comprised of methyl and/or ethyl esters of fatty acids, and is typically derived by the transesterification of vegetable oils and/or animal fats with methanol or ethanol, catalyzed by a base such as potassium hydroxide. The resulting by-product, crude glycerol, includes the potassium hydroxide as well as any water present in the potassium hydroxide.

Any fatty acids present in the triglycerides must be neutralized with the basic catalyst. As a result, if the triglycerides include even one percent fatty acids, the amount of salt and water in the glycerol increases significantly. Because glycerol is only about ten percent of the reaction volume, an additional one percent of potassium hydroxide in effect doubles the amount of salt and water in the crude glycerol product, relative to the use of one percent by volume of the basic catalyst.

The glycerol by-product can be used to prepare other value added products, including glycerol ethers. These are typically prepared by the acid-catalyzed etherification of glycerol with isobutylene. Because the glycerol ether chemistry is acid catalyzed, the base must be neutralized. Also, because isobutylene reacts with water to product t-butanol, the water must be removed as well.

Because it is relatively expensive to purify the crude glycerol to prepare it for third party usage, the crude glycerol from biodiesel production typically has a low value. Accordingly, it would be beneficial to provide processes for producing biodiesel fuel that provide glycerol in a more pure form, and/or for purifying the crude glycerol in a way that provides additional yields of biofuel, ideally in a manner which improves the resulting biodiesel fuel synthesis as well. The present invention provides such processes.

SUMMARY OF THE INVENTION

Processes for producing biodiesel compositions are disclosed.

Triglycerides are the starting material for the processes for producing biodiesel fuel described herein. Any triglyceride can be used that provides a fuel additive composition with desired properties, including vegetable oils and fats and animal oils and fats. Any vegetable oil or animal fat can be used, and in one embodiment, animal fats comprise between approximately 1 and 50 percent by weight of the triglycerides. If animal fats comprise more than 50 percent of the triglycerides, the viscosity of the fuel additive composition may be too high for use at low temperatures.

The triglycerides are reacted with an alcohol, ideally methanol and/or ethanol, to form fatty acid methyl and/or ethyl esters. The transesterification reaction can be catalyzed with a homogeneous basic catalyst, such as sodium hydroxide, sodium methoxide, and the like, or with a solid-phase catalyst, ideally one with both acid and base functionality.

Ideally, the triglycerides include very little free fatty acids (FFAs). However, if FFAs are present, the present invention provides three ways to remove the FFAs. One way to remove the FFAs is by reaction with isobutylene, or other olefins which produce a secondary or tertiary carbocation, in the presence of an acid catalyst, ideally a heterogeneous acid catalyst, to form t-butyl or other esters. The acid is removed, in the case of a heterogeneous catalyst, or neutralized, in the case of a homogeneous catalyst, before the base-catalyzed transesterification takes place.

The acid catalyst can be a proton source, such as hydrochloric acid, sulfuric acid, and hydrobromic acid, or can be a Lewis acid, for example, aluminum chloride, ferrous chloride, and zeolites. Ideally, the esterification reaction is catalyzed with a "dry" acid catalyst, such as Dowex 50™, zeolites, or acidic ionic liquids. After the esterification is complete, the acid catalyst can be easily removed, by filtration or decantation, and not react with the basic catalyst in the transesterification step.

The transesterification and etherification reactions can be run in separate reactors, or in one reactor. The esterification reaction is preferably run at or around room temperature, to avoid excessive polymerization of the olefin. Use of ferrous chloride can be preferred, since this catalyst is known to minimize the polymerization of olefins. If the esterification is run at temperatures in excess of 70° C., isobutylene dimers and trimers may be formed.

The t-butyl esters can be present during the transesterification reaction, and may be converted to a different ester by transesterification, to produce t-butanol. Also, any water present in the triglycerides can be converted (by reaction with isobutylene) to t-butanol, which also reacts in the transesterification reaction to form t-butyl esters of fatty acids. Thus, one can achieve several objectives by reacting the FFAs present in the triglyceride with isobutylene.

Another way to remove the FFAs is by Kolbe electrolysis. Kolbe electrolysis converts the FFAs to two major products, the monomer and dimer of the alkyl or alkenyl chain present in the FFA, although other products may be formed as well. These products are suitable for use as a diesel fuel or for use in fuel for power generation. Because the FFAs are no longer present in acid form (i.e., they have been converted to a pure hydrocarbon), they will not react with the basic catalyst to produce fatty acid carboxylate salts, thus reducing the amount of basic catalyst needed to catalyze the reaction. Further, fatty acid carboxylate salts tend to act as an emulsifier during phase separation of the biodiesel fuel and glycerol fractions. By removing or minimizing FFAs before or during the transesterification reaction, product separation is easier (i.e., the "rag" layer between the biodiesel and the glycerol fractions are minimized).

Kolbe electrolysis can be a preferred way to remove FFAs, because it does not involve using an acid catalyst that must be removed after the step is complete (i.e., before the transesterification is performed). However, Kolbe electrolysis does not convert any water present in the triglyceride feedstock to an alcohol, so if this embodiment is used, it is advantageous to use dry triglycerides (i.e., less than 0.5% water) if a dry glycerol by-product is desired.

Yet another way to remove the FFAs is to wait until the transesterification reaction is complete, and the FFA carboxylate salts are present in the crude glycerol fraction, and perform Kolbe electrolysis on the crude glycerol fraction. The resulting hydrocarbons are insoluble in glycerol, and can be separated, for example, by distillation or decantation. These hydrocarbons can be used as diesel fuel, motor oil, lubricating oil, or fuel additives, depending on whether they are monomers or dimers of the fatty acid alkyl or alkenyl chain.

The triglycerides are transesterified to form alkyl esters of the fatty acids and glycerol. An alcohol such as methanol, ethanol, propanol, t-butanol, or mixtures thereof can be used to transesterify the triglyceride. Traditional biodiesel synthesis uses sodium hydroxide to catalyze the reaction. While this can be used in the process described herein, sodium hydroxide reacts with fatty acids to produce water and carboxylate salts, and with methanol to produce water and methoxide salts. The water is then present in the crude glycerol fraction, making it less pure, and it requires additional energy input to remove the water (i.e., by distillation).

In those embodiments where it is desired to produce a drier crude glycerol fraction, rather than catalyzing the transesterification with a hydroxide base, which adds water to the reaction mixture, the reaction can be catalyzed by an alkoxide, such as potassium or sodium methoxide, ethoxide, or t-butoxide. These basic catalysts are extremely strong bases, stronger than hydroxide, and do not include or form water. By using methoxide directly, the water that would otherwise be added using conventional biodiesel manufacture is avoided.

In such embodiments, when the transesterification reaction is completed, and the biodiesel is isolated, the glycerol will be extremely dry, because no water is present. However, since the transesterification chemistry is typically performed with an excess of alcohol, the excess alcohol is typically removed at this stage, by distillation. The resulting glycerol will include the alkoxide catalyst, which can include an alkoxide of glycerol. This salt, if not easily removed from the glycerol, can be converted to a neutral salt by reaction with an acid, ideally without the addition of water. For example, the glycerol and alkoxide mixture can be reacted with hydrogen chloride gas, which will react with the alkoxide to form the alcohol, and liberate heat. The resulting salt (i.e., sodium or potassium chloride) is sparingly soluble in the glycerol and the bulk of it can be removed, for example, by filtration, particularly if the glycerol is heated to a sufficient temperature to lower its viscosity.

If the remaining chloride salt would be damaging to plant equipment used to convert the glycerol to glycerol ethers, a different anhydrous acid can be used to neutralize the alkoxide salt.

The resulting glycerol is relatively pure, and can be used directly to prepare glycerol ethers. These ethers, when combined with conventional diesel fuel, biodiesel fuel, or conventional gasoline products, provide advantageous properties similar to those provided by methyl t-butyl ether (MTBE).

The processes described herein produce a biodiesel fuel with higher yields than conventional processes, by converting the FFAs to biodiesel fuel or to hydrocarbons in the diesel range, as well as by minimizing the "rag" layer caused by the fatty acid carboxylate salts. This enables one to use triglyceride raw materials that would be considered "off-spec" with conventional biodiesel processes, which can only tolerate about 2.5% fatty acids by volume. For example, the processes described herein work well with used cooking oil, which includes relatively high FFA concentrations, as well as additional water content.

The formation of a relatively purer glycerol by-product facilitates conversion of the glycerol to glycerol ethers, which increases the overall yield of fuel from the starting triglycerides.

DETAILED DESCRIPTION OF THE INVENTION

Processes for converting triglycerides to biodiesel, and for producing a relatively dry glycerol by-product, are disclosed.

In some embodiments, the processes described herein are integrated processes. As used herein, the term "integrated process" refers to a process which involves a sequence of steps, some of which may be parallel to other steps in the process, but which are interrelated or somehow dependent upon either earlier or later steps in the total process.

The following definitions will further define the invention:

The term "alkyl", as used herein, unless otherwise specified, refers to a saturated straight, branched, or cyclic hydrocarbon of $C_{1-6}$, and specifically includes methyl, ethyl, propyl, isopropyl, butyl, isobutyl, t-butyl, pentyl, cyclopentyl, isopentyl, neopentyl, hexyl, isohexyl, cyclohexyl, 3-methylpentyl, 2,2-dimethylbutyl, and 2,3-dimethylbutyl.

The term "olefin" refers to an unsaturated straight, branched or cyclic hydrocarbon of $C_{2-10}$, and specifically includes ethylene, propylene, butylene, isobutylene, pentene, cyclopentene, isopentene, hexene, cyclohexene, 3-methylpentene, 2,2-dimethylbutene, 2,3-dimethylbutene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, and 5-decene. Ethylene, propylene and isobutylene can be preferred due to their relatively low cost, and $C_{2-8}$ olefins can be preferred as they are produced as the major products in Fischer-Tropsch synthesis when an iron catalyst is used.

Highly substituted olefins are preferred because they can stabilize a carbocation intermediate more readily than unsubstituted olefins I. Biodiesel Fuel Composition The biodiesel fuel prepared according to the process described herein may be different from conventional biodiesel, in that it can include a) t-butyl esters of fatty acids in addition to the methyl and/or ethyl esters typically present in biodiesel or b) hydrocarbons produced by the Kolbe electrolysis of fatty acids.

The biodiesel fuel can be used directly as a fuel, for example, in diesel automobiles and trucks, or blended with diesel fuel or other fuel products.

The fuel composition can optionally include glycerol ethers. Glycerol ethers are defined as compounds in which one, two or three of the hydroxy groups (OH) in glycerol has been etherified (i.e., O-alkyl).

II. Components Used to Prepare the Fuel Composition

A. Triglycerides

Vegetable oils are mostly comprised of triglycerides, which are triesters of glycerol, $CH_2(OH)CH(OH)CH_2(OH)$, and fatty acids. Fatty acids are, in turn, aliphatic compounds containing 4 to 24 carbon atoms and having a terminal carboxyl group. Diglycerides are esters of glycerol and two fatty acids, and monoglycerides are esters of glycerol and one fatty acid. Naturally occurring fatty acids, with only minor exceptions, have an even number of carbon atoms and, if any unsaturation is present, the first double bond is generally located between the ninth and tenth carbon atoms. The characteristics of the triglyceride are influenced by the nature of their fatty acid residues.

Any source of triglycerides can be used to prepare the fatty acid ester derivatives that provide a fuel additive composition with the desired properties, including vegetable oils and fats and animal oils and fats. Examples of suitable vegetable oils include, but are not limited to, crude or refined soybean, corn, coconut (including copra), palm, rapeseed, cotton and oils. Examples of suitable animal fats include, but are not limited to, tallow, lard, butter, bacon grease and yellow grease. Naturally-occurring fats and oils are the preferred source of triglycerides because of their abundance and renewability. Oils with a relatively higher boiling point are preferred over oils with a relatively lower boiling point.

The processes described herein can tolerate a relatively higher FFA concentration than traditional biodiesel processes. Accordingly, used cooking oils, rancid oils, or any triglyceride feedstock with up to about 15% FFA content or more can be used.

B. Alcohols

Any alcohol that provides a fuel additive composition with the desired properties can be used to prepare the fatty acid alkyl esters. Typically, ethanol and/or methanol are used, although any saturated straight, branched, or cyclic $C_{1-6}$ alcohol can be used. Examples include methanol, ethanol, propanol, isopropanol, butanol, isobutanol, t-butanol, pentanol, cyclopentanol, isopentanol, neopentanol, hexanol, isohexanol, cyclohexanol, 3-methylpentanol, 2,2-dimethylbutanol, and 2,3-dimethylbutanol.

It is preferred that any alcohol used in the present invention contains less than five percent water, preferably less than approximately one percent water, to avoid saponification or hydrolysis of the triglycerides and to minimize the amount of water present in the glycerol by-product.

The fatty acid alkyl esters are preferably methyl esters, ethyl esters, or combinations thereof. Blends of ethyl and methyl esters are slightly less expensive and can perform nearly as well in biodiesel fuel as pure ethyl esters, and have lower melting points, albeit with the limitation of additional toxicity. Fuel additive compositions that include fatty acid t-butyl esters can also be preferred.

C. Olefins

Any olefin that can be made to react with glycerol can be used in the glycerol ether synthesis. Ideally, these olefins comprise $C_{2-10}$ straight, branched, or cyclic olefins. It is preferred that these olefins contain only hydrogen and carbon. Suitable olefins for use in the present invention include, but are not limited to, propylene, butylene, isobutylene, pentene, cyclopentene, isopentene, hexene, cyclohexene, 3-methylpentene, 2,2-dimethylbutene, 2,3-dimethylbutene, 1-heptene, 2-heptene, 3-heptene, 1-octene, 2-octene, 3-octene, 4-octene, 1-nonene, 2-nonene, 3-nonene, 4-nonene, 1-decene, 2-decene, 3-decene, 4-decene, and 5-decene. Highly substituted olefins are preferred because they can stabilize a carbocation intermediate more readily than unsubstituted olefins.

Ideally, isobutylene is used to convert any FFAs present in the triglycerides to t-butyl esters. However, other olefins that can form tertiary carbocations in the course of the esterification reaction can also be used. Since virtually any olefin will form a combustible product (i.e., a glycerol ether), it is unnecessary to form glyceryl ethers from pure olefins. Mixtures of olefins and paraffins can be used, for example, if the raw material price is lower and it would be costly to separate the olefins from the paraffins. Following glycerol ether formation, the glycerol ethers will be expected to have a significantly higher boiling point than the unreacted paraffins, and the paraffins can be removed, for example, by distillation, if desired. Alternatively, if the paraffins are in the molecular weight range where they can be burned as fuel, they can remain in the glycerol ether composition. An example of such a feedstock is isobutylene. Isobutylene obtained from raffinates often includes isobutane and/or other paraffinic contaminants, which contaminants are unreactive with the glycerol. This feedstock, often available in purities between 90 and 95%, is significantly cheaper than isobutylene, because it is relatively expensive to remove isobutylene from these contaminants. By converting the crude isobutylene to glycerol ethers, one can separate the contaminants from the finished glycerol ether product, resulting in a relatively inexpensive process for producing glycerol ethers.

D. Catalysts

Any acid catalyst that is suitable for performing esterifications or etherifications can be used, in any effective amount and any effective concentration. Examples of suitable acids include, but are not limited to, acidic ionic liquids, hydrochloric acid, hydrobromic acid, sulfuric acid, nitric acid, and solid catalysts such as Dowex 50™. Strong acids are preferred catalysts. The most preferred acid catalyst is sulfuric acid. In a preferred embodiment, approximately one cup of concentrated sulfuric acid is added per ten gallons of oil.

Ionic liquids are organic compounds that are liquid at room temperature. They differ from most salts, in that they have very low melting points. They tend to be liquid over a wide temperature range, are not soluble in non-polar hydrocarbons, are immiscible with water, depending on the anion, and are highly ionizing (but have a low dielectric strength). Ionic liquids have essentially no vapor pressure. Most are air and water stable, and they are used herein to solubilize olefin-complexing metal salts. The properties of the ionic liquids can be tailored by varying the cation and anion. Examples of ionic liquids are described, for example, in J. Chem. Tech. Biotechnol., 68:351-356 (1997); Chem. Ind., 68:249-263 (1996); and J. Phys. Condensed Matter, 5: (supp 34B):B99-B106 (1993), Chemical and Engineering News, Mar. 30, 1998, 32-37; J. Mater. Chem., 8:2627-2636 (1998); and Chem. Rev., 99:2071-2084 (1999), the contents of which are hereby incorporated by reference.

Many ionic liquids are formed by reacting a nitrogen-containing heterocyclic ring, preferably a heteroaromatic ring, with an alkylating agent (for example, an alkyl halide) to form a quaternary ammonium salt, and performing ion exchange or other suitable reactions with various Lewis acids or their conjugate bases to form ionic liquids. Examples of suitable heteroaromatic rings include substituted pyridines, imidazole, substituted imidazole, pyrrole and substituted pyrroles. These rings can be alkylated with virtually any straight, branched or cyclic $C_{1-20}$ alkyl group, but preferably, the alkyl groups are $C_{1-16}$ groups, since groups larger than this tend to produce low melting solids rather than ionic liquids.

Various triarylphosphines, thioethers and cyclic and non-cyclic quaternary ammonium salts have also been used. Counterions which have been used include chloroaluminate, bromoaluminate, gallium chloride, tetrafluoroborate, tetrachloroborate, hexafluorophosphate, nitrate, trifluoromethane sulfonate, methylsulfonate, p-toluenesulfonate, hexa fluoroantimonate, hexa fluoroarsenate, tetrachloroaluminate, tetrabromoaluminate, perchlorate, hydroxide anion, copper dichloride anion, iron trichloride anion, zinc trichloride anion, as well as various lanthanum, potassium, lithium, nickel, cobalt, manganese, and other metal-containing anions.

Certain low melting solids can also be used in place of ionic liquids, depending on the particular separation to be effected. Low melting solids are generally similar to ionic liquids but have melting points between room temperature and about 212° F. or are liquid under the process conditions.

Although ionic liquids, generally, can either be neutral, acidic or basic, acidic ionic liquids are used as acid catalysts. The acidity of the ionic liquids can be adjusted by varying the molar equivalents and type and combinations of Lewis acids.

Of course, when an acid catalyst is used to esterify FFAs present in the triglycerides, the acid must be removed before the transesterification of the triglycerides is performed using a basic catalyst, or additional catalyst must be used. For this reason, it can be preferred to use a solid acid catalyst or an acidic ionic liquid, as these can be readily separated from the triglycerides (i.e., via decantation or filtration).

The presence of glyceryl ethers in the fuel composition can help lower the gel temperature of the fuel, i.e., the temperature at which the fuel becomes so viscous that it cannot be used. The presence of hydroxy groups on partially etherified glycerol derivatives may also improve nitrogen oxide emissions and particulate emissions.

IV. Methods for Preparing the Fuel Composition

The biodiesel fuel can be produced by optionally esterifying any FFAs that are present, or performing Kolbe electrolysis on the FFAs, before transesterifying the triglycerides with an alcohol. The transesterification ideally uses an alkoxide rather than a hydroxide catalyst, and a relatively dry alcohol starting material, to minimize the water content in the reaction mixture. The glycerol thus produced will be drier than that produced where the water content of the triglyceride, alcohol, and basic catalyst is not taken into consideration. The alkoxide catalyst can be neutralized by reacting the glycerol by-product with an acid, ideally a dry acid such as gaseous hydrogen chloride, to form a salt that is relatively insoluble in the dry glycerol.

Given that relatively pure glycerol sells for a considerable amount more than impure glycerol, this can add tremendous value to the process. Further, it permits the ready synthesis of glycerol ethers from the glycerol by-product, without significant purification steps.

A. Fatty Acid Esterification

Starting with triglycerides, the first step in the process can optionally include either reaction of any FFAs that might be present with isobutylene to form t-butyl esters of the fatty acids, or Kolbe electrolysis of the FFAs to form monomers and dimers of the alkyl chain on the fatty acid. If the FFAs are esterified, any acid catalyst that is used in this step needs to be removed before the base-catalyzed transesterification step, or the transesterification must be performed using acid conditions.

The esterification step can be performed at any suitable temperature, typically between about 0° C. and about 50° C., and, ideally, at or slightly below room temperature (i.e., around 15° C. Relatively lower temperatures are preferred because they can minimize the presence of by-products, such as dimers and trimers of isobutylene. While these burn well, it can be desired to minimize their concentration.

Any water present in the triglycerides will react with the isobutylene to form t-butanol, which can be used in the subsequent transesterification step. This is advantageous, as it provides an easy method for drying the triglycerides in addition to removing any fatty acids that might be present.

Because the fatty acids are removed, they cannot react with the basic catalyst used in the transesterification step. Further, because fatty acid carboxylate salts are not isolated in standard biodiesel processes, the conversion of FFAs to t-butyl esters improves product yield, both because they are present as product, and because carboxylate salts are not present in a rag layer, which can lower yield.

B. Conversion of Free Fatty Acids to Alkanes

Free fatty acids in the triglycerides can also be converted to alkanes via Kolbe electrolysis or enzymatic decarboxylation. Suitable enzymes and reaction conditions for enzymatic hydrolysis are known in the art (i.e., http://arginine.chem.cornell.edu/Publications/Abstracts/Abs149.html). Decarboxylation reactions are widespread in biochemical pathways. The main feature of a decarboxylase is its ability to stabilize the developing carbanion, most often through delocalization of the negative charge. Three suitable enzymes are S-adenosylmethionine decarboxylase, phosphoribosyl carboxyaminoimidazole mutase and orotidine-5'-monophosphate decarboxylase.

The Kolbe Synthesis is an anodic oxidation process of a carboxylate anion. A radical is formed which decarboxylates. The resulting radical combines with another to form a dimer. For example, acetic acid will lose a mole of carbon dioxide to produce a methyl radical, two of which will combine to form ethane. The efficiency of Kolbe electrolysis efficiency is sensitive to water. It can therefore be preferred to run the reaction in (almost) water-free conditions. For this reason, it can be preferred to hydrolyze the triglyceride into free fatty acids in an ionic liquid, and also to perform the kolbe electrolysis in an ionic liquid. Anion exchange membranes can be used as solid polymer electrolytes (http://www.pca-gmbh.com/appli/spe.htm).

Because Kolbe electrolysis is often advantageously performed on carboxylate salts of fatty acids, rather than FFAs, this step can be performed after the alcohol and alkoxide are added to the reaction mixture. The alkoxides react with the FFAs to form carboxylates, but once the carboxylate salts are converted to the alkane products, the alkoxides are re-formed. This is advantageous in that the amount of catalyst can be minimized, to that amount which is needed to catalyze the reaction, versus the additional amount that would have been added to convert the FFAs to their carboxylate salts. An additional advantage is that the hydrocarbons produced by the Kolbe step do not form a rag layer, like the carboxylate salts do, so product separation is easier. Further, the hydrocarbons burn well, and add to the product yield, versus the fatty acid carboxylate salts which do not add to the product yield, or are present as an impurity.

One relative disadvantage to the use of Kolbe electrolysis of FFAs versus esterification of FFAs is that any water present in the triglycerides will still be present (i.e., it will not be removed during this step). However, an advantage is that rather than having to remove an acid catalyst, one only has to remove an electrode. Further, by monitoring the carbon dioxide evolution, one can easily determine when the fatty acids have been removed. That is, as the reaction proceeds, carbon dioxide and hydrogen gas are produced. When the gas stops evolving, the fatty acid conversion to alkanes is complete, and the transesterification step can proceed.

In another embodiment, the fatty acid salts present in crude glycerol are converted to hydrocarbon products by performing Kolbe electrolysis on the crude glycerol fraction. Crude glycerol often includes up to about 20% or more by weight of fatty acid salts. Kolbe electrolysis is preferably performed on the carboxylate salts, and FFAs present in the starting material are present as carboxylate salts in the crude glycerol. The resulting hydrocarbon product separates from the crude glycerol fraction, and can be removed, for example, by decantation and/or distillation. The product is ideal for use in or as diesel fuel, or in power generation (for example, as an additive to the Number 6 oil used in some power generators).

Once the fatty acid salts have been removed, the glycerol typically includes water, methanol (or other alcohols), and salts, such as hydroxide and methoxide (or alkoxide). Addition of an acid, ideally a dry acid so that water production is minimized, converts hydroxide to water and alkoxides to the corresponding alcohols. The water and alcohols can be removed by distillation, and the alcohols recycled to the biodiesel reactor.

The resulting salt concentration will typically exceed the solubility limit, of glycerol, so that at least some of the salts can be removed, by filtration or decantation. Since glycerol is quite viscous, decantation can be preferred, unless the glycerol is heated to reduce its viscosity.

The resulting purified glycerol will still include some salts, but as these salts do not interfere with glycerol ether synthesis, the glycerol will be pure enough to convert to glycerol ethers.

C. Transesterification

The triglycerides can be transesterified to form fatty acid esters and glycerol. Methods for performing transesterification reactions are well known in the art, as they are the principal method by which biodiesel is formed. In one embodiment, however, instead of conventional hydroxide catalysts, alkoxide catalysts can be used. Hydroxide catalysts react with alcohol to form water, which can be present in the glycerol at the end of the reaction. As it is advantageous to minimize the amount of water in the glycerol at the end of the reaction, the use of alkoxide catalysts and/or dry alcohol is preferred.

The transesterification reactions generally go to completion in approximately six to twenty four hours, and can be run in both batch-type and continuous reactors. Reaction conditions for transesterification reactions are known to those of skill in the art.

D. Product Isolation

Once the transesterification reaction is complete, the products can be separated. Biodiesel is separated from the glycerol/alcohol/alkoxide mixture. Excess alcohol, used to ensure that the transesterification goes to completion, can be isolated by distillation and can be re-used, either before or after the alkoxide catalyst is neutralized (to form the alcohol).

The glycerol/alkoxide mixture can be treated with acid, preferably a dry acid, such as hydrogen chloride gas, phosphoric acid, or sulfuric acid. Ideally, no more acid is used than is necessary to neutralize the alkoxide.

The acid reacts with the alkoxide to form a salt and the alcohol. This amount of alcohol is equivalent to the molar amount of catalyst used, for example, about one percent of the total reaction volume. Because glycerol is about ten percent of the total reaction volume, if the catalyst is present at a concentration of about one percent, the alkoxide (and, thus, the neutralized alkoxide in the form of a salt and an alcohol) will each be in a concentration of about ten percent in the glycerol. The alcohol can be removed from the glycerol, for example, by distillation, and the addition of the acid to the alkoxide heats the mixture, so that distillation can be performed with minimal added heat. The alcohol, when distilled, may include some of the acid (i.e., if gaseous hydrogen chloride is used as the acid, the methanol may include some hydrogen chloride concentration following the distillation process). Any acid that is present must be neutralized before the alcohol can be re-used in the base-catalyzed transesterification step.

The glycerol, free of the alcohol, includes a salt and residual acid. Ideally, the bulk of the salt can be removed by filtration or decantation. The residual acid and salt can be left in the glycerol if a) the glycerol is to be converted to glycerol ethers, and b) the acid and salt do not adversely affect the glycerol ether synthesis, or the equipment used to convert glycerol to glycerol ethers. For example, stainless steel reactors are known to react with, and be weakened by, chloride ions, so if the etherification is to be performed in a stainless reactor, it can be advantageous to use an acid other than gaseous hydrogen chloride to neutralize the alkoxide, such as sulfuric or phosphoric acid.

E. Alternative Method for Purifying Crude Glycerol

The crude glycerol fraction is about 15-20 percent of the volume of the initial reaction mixture. This fraction includes glycerol, water, methanol, methoxide salts, hydroxide salts, and fatty acid carboxylate salts. The amount of carboxylate salts varies depending on the amount of fatty acids present in the initial feedstock. However, if the feedstock included 2% fatty acids, and glycerol is about 10% of the volume of the triglyceride fraction, then the fatty acid carboxylate salts will make up around 20% of the crude glycerol fraction. Further, since sodium hydroxide or methoxide is typically used to a) neutralize the fatty acids and b) catalyze the reaction, there is typically at least 1% more sodium hydroxide or methoxide present than fatty acids, at the start of the reaction. Accordingly, the amount of sodium hydroxide is around 30% of the crude reaction mixture. The crude glycerol also includes leftover methanol.

It is desirable to recover and recycle as many of these components as possible, to minimize the waste stream, and maximize the amount of renewable fuel.

In some embodiments, it may not be feasible to subject the crude glycerol to Kolbe electrolysis. However, by acifidying the crude glycerol fraction, ideally with an anhydrous acid such as HCl gas, or concentrated sulfuric or phosphoric acid, one can convert the fatty acid carboxylate salts to free fatty acids, and the methoxide salts to methanol.

The methanol can be removed by distillation, at which point the fatty acids can be extracted into an organic solvent, such as hexane, and recovered by distilling off the hexane. The hexane can be recycled to extract additional fatty acids. The fatty acids can be combined with the recovered methanol to form additional biodiesel, for example, by using an acid catalyst, or added to the fuel compositions used to power generators (such as number two and number six oil).

There are different types of heating oil (also used to fuel generators to generate electric power) to which the fatty acids (or the products of the Kolbe electrolysis) can be added. The main type of heating oil used in most homes and commercial applications is number two heating oil. There are six different types of oil used in heating applications. Number two heating oil is used in most residential and commercial heating oil systems and it shares the same classification as diesel fuel. Number 1, number 2, and number 3 fuel oils are referred to as distillate fuel oils because during the refining process the oil is heated until it evaporates and is then condensed. These oils are distilled from raw crude oil. Number 4 fuel oil is a blend of distilled oil and heavy or residual fuel oils like number 5 and 6 fuel oils. Number 6 fuel oils are often the residual of what is left over after refining gasoline and the distilled fuel oils.

Residual fuel oils are the least common fuel oil used today for pollution reasons and because the oil typically must be heated to 150 degrees Fahrenheit before it can be pumped from the holding tank to the boiler. However, residual fuel oils are still used today for generating electricity and heating applications.

The addition of free fatty acids, the products of the Kolbe electrolysis, and/or the glycerol ethers to the fuel oils described above can improve the properties of these oils. In some cases, these components can lower the fuel oil's viscosity, increase its energy output, and increase the amount of energy that can be generated from a given volume of triglycerides. Compositions including between about 70 and 99 percent fuel oil and between about 1 and 30% free fatty acids, the products of the Kolbe electrolysis of fatty acids, and/or glycerol ethers are also within the scope of this invention.

Assuming that methanol, water, and fatty acids are recovered from the crude glycerol fraction, the bulk of what remains is glycerol and salt. The salt will be relatively less soluble in glycerol than in the mixture of glycerol, water, and methanol found in crude glycerol, and at least some of the salt can be removed by decantation or filtration. The resulting glycerol, less impure than the crude glycerol, can be burned for its energy value, land-filled, purified, converted to glycerol ethers or other products, and the like.

F. Conversion of Glycerol to Glycerol Ethers

The glycerol can be sold directly, or converted to glycerol ethers by etherification, in the presence of olefins, using an acid catalyst. Glycerol has up to three hydroxy groups to etherify, and ideally, on average, two of the hydroxyl groups are etherified. That is, if two equivalents of an olefin such as isobutylene are used, the resulting product mixture will include glycerol, glycerol t-butyl ether, glycerol di-t-butyl ether, and glycerol tri-t-butyl ether, in various ratios.

The extent of etherification (as well as the prior optional esterification step) can be followed by means known to those of skill in the art, including high performance liquid chromatography and gas chromatography. Representative chromatography conditions for following the degree of esterification of fatty acids are described, for example, in Christopolou and Perkins, "High Performance Size Exclusion Chromatography of Fatty Acids, Mono-, Di- and Triglyceride Mixtures." The etherification is preferably run until the desired range of components, as discussed above, is obtained.

The resulting fatty acid esters and/or glycerol ethers can be directly blended with diesel fuel, or washed with water or other aqueous solutions to remove various impurities, including the catalysts, before blending.

It is possible to neutralize acid catalysts with base. However, this process produces salt. To avoid engine corrosion, it is preferable to minimize the salt concentration in the fuel composition. Salts can be substantially removed from the fuel additive composition, for example, by washing the composition with water, or by passing the product through a column packed with a suitable de-salting resin (i.e., which replaces a cation with $H^+$ and an anion with $OH^-$, producing water and removing salt).

In another embodiment, the composition is dried after it is washed, for example, by passing the composition through a drying agent such as calcium sulfate.

In yet another embodiment, a neutral fuel additive is obtained without producing salts or using a washing step, by using a polymeric acid, such as Dowex 50™, which is a resin that contains sulfonic acid groups. The catalyst is easily removed by filtration after the etherification reaction is complete.

G. Filtration of the Fuel Composition

In one embodiment, the fuel composition is filtered, preferably through a filter with a pore size of between approximately 5 and 50 microns, more preferably, between approximately 10 and 20 microns, to remove solid impurities. This can be especially important when animal fats are used, since rendering processes can inadvertently place small pieces of bone and other particulate matter in the animal fat that needs to be removed.

Modifications and variations of the present invention relating to a fuel additive composition and an alternative fuel derived from the composition will be obvious to those skilled in the art from the foregoing detailed description of the invention.

The invention claimed is:

1. A method for preparing a biodiesel product, comprising the steps of:
    a) obtaining a triglyceride starting material which contains from about 0.5 to about 10% free fatty acids,
    b) removing at least some of the free fatty acids by Kolbe electrolysis, and
    c) transesterifying the triglyceride with a $C_{1-4}$ alcohol to form a product mixture including a biodiesel fraction and a crude glycerol fraction.

2. The method of claim 1, wherein the transesterification is carried out using a $C_{1-4}$ alkoxide catalyst.

3. The method of claim 1, wherein the transesterification is carried out using a solid catalyst with acidic and basic sites.

4. The method of claim 1, wherein the triglyceride comprises animal fat.

5. The method of claim 1, wherein the triglyceride comprises used cooking oil.

6. The method of claim 1, wherein the crude glycerol comprises glycerol, excess alcohol, and an alkoxide salt, and the alkoxide salt is neutralized using an acid to form an alcohol and a salt.

7. The method of claim 6, wherein the acid is hydrogen chloride gas or sulfuric acid.

8. The method of claim 7, further comprising separating the alcohol from the glycerol by distillation.

9. The method of claim 6, wherein at least a portion of the salt is removed from the glycerol by filtration or decantation.

10. The method of claim 6, wherein at least a portion of the glycerol is subjected to etherification.

11. The method of claim 10, wherein the etherification is performed using isobutylene.

12. The method of claim 11, wherein the isobutylene comprises an isobutane impurity.

13. The method of claim 11, wherein the ratio of glycerol to isobutylene is between about 1:1.5 and 1:2.5.

* * * * *